United States Patent
Be'ery et al.

(10) Patent No.: US 10,511,599 B2
(45) Date of Patent: Dec. 17, 2019

(54) SYSTEM TO FILTER IMPOSSIBLE USER TRAVEL INDICATORS

(71) Applicant: Microsoft Technology Licensing, LLC, Redmond, WA (US)

(72) Inventors: Tal Arieh Be'ery, Petach Tikva (IL); Ami Luttwak, Tel-Aviv (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 149 days.

(21) Appl. No.: 15/457,554

(22) Filed: Mar. 13, 2017

(65) Prior Publication Data
US 2018/0262498 A1    Sep. 13, 2018

(51) Int. Cl.
*H04L 29/06* (2006.01)
*H04L 29/08* (2006.01)
*G06F 21/31* (2013.01)

(52) U.S. Cl.
CPC ........ *H04L 63/0876* (2013.01); *G06F 21/316* (2013.01); *H04L 63/107* (2013.01); *H04L 63/1416* (2013.01); *H04L 63/1425* (2013.01); *H04L 67/18* (2013.01); *H04L 67/22* (2013.01); *G06F 2221/2111* (2013.01)

(58) Field of Classification Search
CPC ... H04L 63/0876; H04L 67/22; H04L 63/107; H04L 67/18; H04L 63/1425; H04L 63/1416; G06F 21/316; G06F 2221/2111
See application file for complete search history.

(56) References Cited

U.S. PATENT DOCUMENTS

| | | | |
|---|---|---|---|
| 3,767,181 | A | 10/1973 | Van der Burgt et al. |
| 3,940,935 | A | 3/1976 | Richardson et al. |
| 4,131,378 | A | 12/1978 | Daws |
| 4,673,170 | A | 6/1987 | Dykema |
| 5,405,337 | A | 4/1995 | Maynard |
| 5,510,957 | A | 4/1996 | Takagi |
| 5,629,662 | A | 5/1997 | Floyd et al. |

(Continued)

OTHER PUBLICATIONS

"Skyhigh Threat Protection", https://www.skyhighnetworks.com/skyhigh-threat-protection/, Published on: Apr. 1, 2016, 7 pages.

(Continued)

*Primary Examiner* — Meng Li
(74) *Attorney, Agent, or Firm* — Workman Nydegger

(57) ABSTRACT

Mitigating false positives for impossible travel alerts. A first user access location for a user is provided, for a first user access of computing resources identified using a first identification process, to a user behavior analytics service. The first identification process identifies a real world indicator of location for a device associated with the first user access. A second user location is provided for the user, for a second user access of computing resources, to the user behavior analytics service, using a second identification process. The second identification process identifies a location associated with an egress point to which communication to and from a device is routed to access computing resources, such that the user behavior analytics service receives a location associated with the egress point as the second user location. At the user behavior analytics service, the second user location is filtered from being used for impossible travel detection.

20 Claims, 5 Drawing Sheets

(56) References Cited

U.S. PATENT DOCUMENTS

| | | | |
|---|---|---|---|
| 5,818,182 A | 10/1998 | Viswanadham et al. | |
| 6,129,181 A | 10/2000 | Weems | |
| 6,459,855 B1 | 10/2002 | Kosaka et al. | |
| 6,530,784 B1 | 3/2003 | Yim et al. | |
| 6,574,958 B1 | 6/2003 | MacGregor | |
| 6,583,985 B2 | 6/2003 | Nguyen et al. | |
| 6,771,494 B2 | 8/2004 | Shimano | |
| 6,781,819 B2 | 8/2004 | Yang et al. | |
| 6,845,005 B2 | 1/2005 | Shimano et al. | |
| 6,944,012 B2 | 9/2005 | Doczy et al. | |
| 7,275,846 B2 | 10/2007 | Browne et al. | |
| 7,380,843 B2 | 6/2008 | Alacqua et al. | |
| 7,433,694 B2 | 10/2008 | Morgan et al. | |
| 7,779,715 B2 | 8/2010 | Mitteer | |
| 7,814,810 B2 | 10/2010 | Mitteer | |
| 8,083,718 B2 | 12/2011 | Rush et al. | |
| 8,275,758 B2 * | 9/2012 | Tanabe | H04W 4/02 707/706 |
| 8,339,842 B2 | 12/2012 | Boutchich | |
| 8,827,331 B2 | 9/2014 | Corcoran et al. | |
| 8,839,417 B1 * | 9/2014 | Jordan | H04L 63/0227 726/22 |
| 8,947,861 B2 | 2/2015 | Staats et al. | |
| 9,032,130 B2 | 5/2015 | Aldana et al. | |
| 9,069,527 B2 | 6/2015 | Leong et al. | |
| 9,091,251 B1 | 7/2015 | Ullakko et al. | |
| 9,152,789 B2 | 10/2015 | Natarajan et al. | |
| 9,378,361 B1 * | 6/2016 | Yen | G06F 21/55 |
| 9,392,007 B2 | 7/2016 | Giokas | |
| 9,419,992 B2 | 8/2016 | Ricafort et al. | |
| 9,438,565 B2 | 9/2016 | Cohen et al. | |
| 9,450,170 B2 | 9/2016 | Schiepp et al. | |
| 9,501,345 B1 | 11/2016 | Lietz et al. | |
| 9,503,463 B2 | 11/2016 | Karta et al. | |
| 9,509,684 B1 * | 11/2016 | Dixson-Boles | H04L 63/083 |
| 2002/0040227 A1 | 4/2002 | Harari et al. | |
| 2004/0068985 A1 | 4/2004 | Mernoe | |
| 2005/0046374 A1 | 3/2005 | Ogawa et al. | |
| 2006/0267376 A1 | 11/2006 | Mcknight et al. | |
| 2008/0059474 A1 * | 3/2008 | Lim | G06F 21/604 |
| 2008/0127684 A1 | 6/2008 | Rudduck et al. | |
| 2010/0161960 A1 * | 6/2010 | Sadasivan | H04L 63/0272 713/152 |
| 2011/0154817 A1 | 6/2011 | Zimmer et al. | |
| 2012/0102169 A1 * | 4/2012 | Yu | H04L 67/18 709/223 |
| 2012/0308294 A1 | 12/2012 | Corcoran et al. | |
| 2013/0021738 A1 | 1/2013 | Yang et al. | |
| 2013/0047210 A1 | 2/2013 | Rotman | |
| 2014/0026554 A1 | 1/2014 | Browne et al. | |
| 2014/0027108 A1 | 1/2014 | Lopez et al. | |
| 2014/0130316 A1 | 5/2014 | Rudduck et al. | |
| 2014/0193193 A1 | 7/2014 | Wikander et al. | |
| 2014/0225708 A1 | 8/2014 | Usoro | |
| 2014/0347802 A1 | 11/2014 | Lee | |
| 2014/0362509 A1 | 12/2014 | Lin | |
| 2015/0055289 A1 | 2/2015 | Chang et al. | |
| 2015/0116926 A1 | 4/2015 | Robinson et al. | |
| 2015/0207059 A1 | 7/2015 | Laufenberg et al. | |
| 2015/0281355 A1 | 10/2015 | Maturana et al. | |
| 2016/0004279 A1 | 1/2016 | Delpier et al. | |
| 2016/0035608 A1 | 2/2016 | Babbs et al. | |
| 2016/0062411 A1 | 3/2016 | Morrison et al. | |
| 2016/0105801 A1 | 4/2016 | Wittenberg et al. | |
| 2017/0017273 A1 | 1/2017 | Weldon et al. | |
| 2017/0097663 A1 | 4/2017 | Gault et al. | |
| 2019/0005272 A1 | 1/2019 | Gault et al. | |
| 2019/0025890 A1 | 1/2019 | Gault et al. | |

OTHER PUBLICATIONS

Golling, et al., "Privacy-Aware Intrusion Detection in High-Speed Backbone Networks—Design and Prototypical Implementation of a Multi-Layered NIDS", In Gesellschaft fur Informatik, 2016, 10 pages.

Beeri, Yishai, "On-Premises & In The Cloud: Making Sense Of Your Cybersecurity Ecosystem", http://www.darkreading.com/cloud/on-premises-and-in-the-cloud--making-sense-of-your-cybersecurity-ecosystem/a/d-id/1326994, Published on: Sep. 23, 2016, 11 pages.

"Infoblox—ActiveTrust Cloud Datasheet", https://www.infoblox.com/wp-content/uploads/infoblox-datasheet-infoblox-activetrust-cloud-1.pdf, Retrieved on: Dec. 27, 2016, pp. 1-4.

Vilcinskas, Markus, "Types of risk events detected by Azure Active Directory", https://docs.microsoft.com/en-us/azure/active-directory/active-directory-identityprotection-risk-events-types, Published on: Nov. 30, 2016, 5 pages.

"Detect Insider Threats and External Attacks", https://www.splunk.com/en_us/products/premium-solutions/user-behavior-analytics.html, Retrieved on: Dec. 27, 2016, 8 pages.

"Microsoft Surface Book Teardown", Retrieved From: https://www.ifixit.com/Teardown/Microsoft%2BSurface%2BBook%2BTeardown/51972, Nov. 3, 2015, 41 Pages.

Antonello, et al., "Use of Antagonistic Shape Memory Alloy Wires in Load Positioning Applications", In Proceedings of IEEE 23rd International Symposium on Industrial Electronics, Jun. 1, 2014, pp. 287-292.

Kohl, et al., "Magnetic Shape Memory Microactuators", In Micromachines, vol. 5, Issue 4, Nov. 18, 2014, pp. 1135-1160.

"International Search Report and Written Opinion Issued in PCT Application No. PCT/US2018/020992", dated Jul. 4, 2018, 11 Pages.

"International Search Report and Written Opinion Issued in PCT Application No. PCT/US2018/028763", dated Aug. 1, 2018, 12 Pages.

"Non-final Office Action Issued in U.S. Appl. No. 14/956,118", dated Dec. 19, 2016, 13 Pages.

Hollister, Sean, "Lenovo ThinkPad Helix Tablet/laptop Hybrid Gets a Power-Up When it Docks", Retrieved From: http://www.theverge.com/2013/1/6/3844010/lenovo-thinkpad-helix-convertible, Jan. 6, 2013, 3 Pages.

"International Preliminary Report on Patentability Issued in PCT Application No. PCT/US2016/053858", dated Aug. 8, 2017, 7 Pages.

"International Search Report and Written Opinion Issued in PCT Application No. PCT/US2016/053858", dated Dec. 9, 2016, 12 Pages.

"Non-Final Office Action Issued in U.S. Appl. No. 15/599,879", dated Sep. 19, 2019, 11 Pages.

\* cited by examiner

SYSTEM TO FILTER IMPOSSIBLE USER TRAVEL INDICATORS

BACKGROUND

Background and Relevant Art

Computers and computing systems have affected nearly every aspect of modern living. Computers are generally involved in work, recreation, healthcare, transportation, entertainment, household management, etc.

In computing environments, security is an important consideration. In particular, there is usefulness in identifying if a rogue attacker is attempting to access a user's account. One way of making such an identification is to identify that logins are being attempted on a user account that would require impossible travel. For example, if a login is attempted from a computer with a USA IP address and five minutes later a login is attempted with a computer with a French IP address, this would be detected as an impossible travel scenario, that is, it would be impossible for an actual bona fide user to travel from the USA to France in five minutes.

Due to the various ways in which network communication occurs, there are often situations when an impossible travel scenario may be detected, but for which no impossible travel actually occurred. For example, different locations may be determined for a single user based on the user accessing different network devices that have different physical locations associated with them. These so-called "false positives" result in many impossible travel detection mechanisms having limited value.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method that may be practiced in an impossible travel detection system. The method includes acts for mitigating false positives for impossible travel alerts. The method includes providing a first user access location for a user, for a first user access of computing resources identified using a first identification process, to a user behavior analytics service. The first identification process identifies a real world indicator of location for a user device associated with the first user access. The method further includes providing a second user location for the user, for a second user access of computing resources, to the user behavior analytics service, using a second identification process. The second identification process identifies a location associated with an egress point to which communication to and from a user device is routed to access computing resources, such that the user behavior analytics service receives a location associated with the egress point as the second user location. The method further includes at the user behavior analytics service, filtering out the second user location from being used for impossible travel detection.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Impossible travel is an important feature for many security related applications. It detects when an entity (usually an end user) covered a distance in the physical world that is unable to actually be traveled with current travel technologies. An important application of detecting impossible travel is the detection of compromised credential usage via physical location anomalies.

As noted above, due to the various ways in which network communication occurs, there are often situations when an impossible travel scenario may be detected, but for which no impossible travel actually occurred. For example, different locations may be determined for a single user based on the user accessing different network devices that have different physical locations associated with them. These so-called "false positives" result in many impossible travel detection mechanisms having limited value.

Embodiments illustrated herein are able to filter out potential cases where impossible travel may be indicated, but for which impossible travel, in all likelihood, did not occur. This creates an improved computing system that provides more accurate alerts for impossible travel scenarios. Indeed, computing processing power can be conserved as alerts which would normally be false positives do not need to be created and issued thus conserving computing resources.

Figure 1:
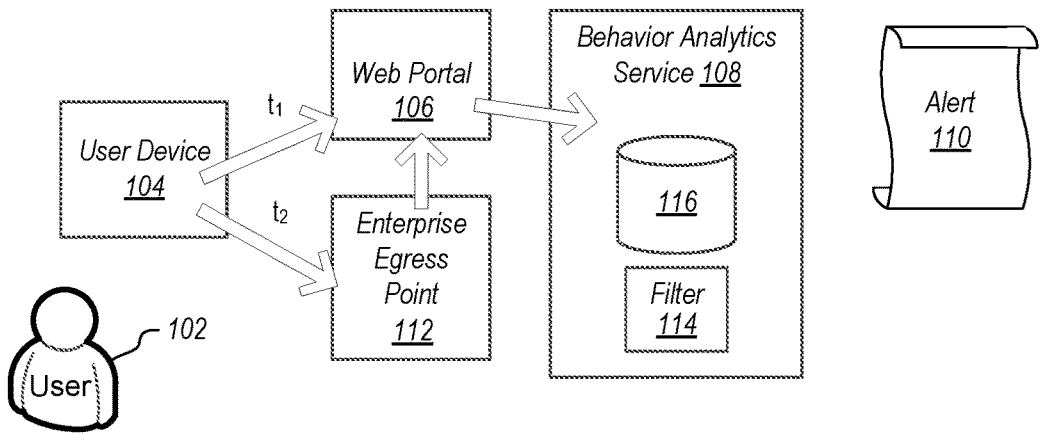
FIG. 1 illustrates a user behavior analytics service for detecting impossible travel.

An example is illustrated in FIG. 1. In this example, a user 102 is using a user device 104. The user 102 may be using the user device 104 to access various resources in a plurality of different fashions. For example, the user 102 may be using the user device 104 to access a web portal 106 that can be used to access information. The web portal 106 may be coupled to a user behavior analytics service 108. This coupling can simply be an API integration of a security service that is able to read audit logs of a web portal. Another example includes reading logs of an identity provider (such as Active Directory available from Microsoft Corporation of Redmond, Wash.) which is responsible for tracking user access across all applications. The user behavior analytics service 108 can log information about the locations associated with information access by the user. For example, in some embodiments, that physical real-world location of the user device 104 may be able to be discovered and logged in a data store 116 at the user behavior analytics service 108. Often, this information is based on an IP address of the user device 104, a GPS location sent from the user device 104 to the web portal 106, cellular signal triangulation based on cellular data usage of the user device 104, or in other fashions that are able to determine the actual real world location of the user device 104. This location information of the user device 104 can be provided to the user behavior analytics service 108. The user behavior analytics service 108 may store this information in entries in the data store 116. In particular, the data store 116 will typically include entries that correlate an access time with a user location.

Entries in the data store 116 can be evaluated by the user behavior analytics service to produce alerts, such as the alert 110 when it is determined that two or more entries are indicative of impossible travel for a user. Thus, for example, entries may include an identification of a user, identification of an access time (including, for example, a date and time of an access), and a location. Entries for a user may be compared to determine if the access times are possible for a single user in view of the locations. If the accesses indicated in the entries are not possible, an alert 110 can be issued by the user behavior analytics service. The alert can be provided to a system administrator for remediation. Alternatively or additionally, embodiments may automatically block user access when such alerts are generated.

In addition to using the web portal 106, a user device 104 (or indeed a different user device for the user) may also access an enterprise egress point 112. An enterprise egress point may be a device located at the boundary of an enterprise network that connects to external networks, wide area networks, and the internet. Thus, the enterprise egress point 112 is typically part of an enterprise network that is allows a user to access the enterprise network through enterprise hardware. For example, the enterprise egress point 112 may be a VPN portal. Alternatively or additionally, the egress point 112 may be an enterprise gateway, as will be discussed in more detail below. The enterprise egress point 112 is also coupled to the web portal 106, which, as noted, is coupled to the behavior analytics service 108. However, location information provided from the enterprise egress point 112 to the web portal 106, and thus ultimately to the behavior analytics service 108, will typically correspond with a real world location (e.g., the real world location of the enterprise egress point 112 or a general location for the enterprise 112) that is different than the user device 104, and in many cases, different than the enterprise egress point 112 itself. This results in the user behavior analytics service 108 potentially identifying that an impossible travel scenario has occurred if the user device 104 (or different user devices for the same user) accesses the web portal 106 at a time $t_1$ and accesses the enterprise egress point 112 at a time $t_2$, where it would be impossible for the user 102 to travel between the real world location of the user device 104 and the real world location associated with the enterprise egress point 112 in the time between $t_1$ and $t_2$. Thus, there may be an attempt by the user behavior analytics service 108 to add entries to the data store 116 which correlate the time $t_1$ with the access by the user device 104 of the web portal 106 along with a location of the user device 104, and which correlate the time $t_2$ with the access by the user device 104 (or other user device) of the enterprise egress point 112 and a location associated with the enterprise egress point 112. Note also, that while a single web portal 106 is illustrated, embodiments may include multiple web portals. For example, one may be used for accessing from a mobile phone and a different web portal used for accessing from a personal computer. The user behavior analytics service 108 cross-correlates user activities across multiple applications and/or portals.

Thus, some embodiments may include a filter 114 implemented at the user behavior analytics service 108, or in another appropriate location, which is able to detect when a user device is connecting to endpoints in a fashion which might cause an invalid indication of impossible travel to occur. Thus, in general, some embodiments are able to detect a real world location of a user device 104 based on an interaction with a first entity, such as the web portal 106, as well as detecting a different location as a result of the user device 104 using an egress point which may have an associated location which may or may not correspond to the real world location of the user device 104. In particular, the user device 104 may be connecting to the enterprise egress point 112, which may have a real world location associated with it that is substantially equivalent to the real world location of the user device 104. For example, this may occur when the user device 104 is used in a location with close proximity to the egress point 112, where the location of the egress point in known and able to be provided to the web portal 106. However, alternatively the egress point 112 may be associated with a real world location that is remote from the user device 104. For example, the egress point 112 may be a gateway in an enterprise environment such that the location associated with the egress point 112 is a general location for the enterprise and is not an accurate location for the egress point 112 itself. The filter 114 can detect that an egress point is being used by the user device 104 and can filter such record entries from the data store 116.

In particular, embodiments can leverage information about the enterprise network and egress points of the enterprise network and mark all known IPs used by the enterprise for edge routers as "edge IPs". Alternatively or additionally, embodiments may heuristically detect an edge IP by detecting IPs which are shared by a large number of users (typical for an edge IP). This will provide information to reduce the score of the alert. However, in some embodiments, this may not be sufficient to compute the estimated user location and to determine if the user is actually active on the network.

Filtering may include one or more of not allowing such entries to be stored in the data store 116, removing such entries form the data store 116, marking such entries in the data store 116 as invalid, or in some cases replacing locations in such entries in the data store with different locations as will be illustrated in more detail below. In this way, certain information about the egress point 112 is not used to attempt to detect an impossible travel scenario.

As alluded to above, in some embodiments, the real world location identified for the enterprise egress point 112 may actually be erroneous. For example, if the enterprise egress point 112 is a gateway for an enterprise, the location of the enterprise egress point 112 may be inaccurately identified due to the fact that an enterprise may have a number of gateways in a number of different geographical locations. However, as illustrated below, some embodiments are able to estimate the location of a gateway and to substitute a determined location of the enterprise egress point 112 with an estimated real world location. This can be useful if it can be determined that the user device 104 is being used in proximity to a gateway acting as the enterprise egress point 112.

Figure 2:
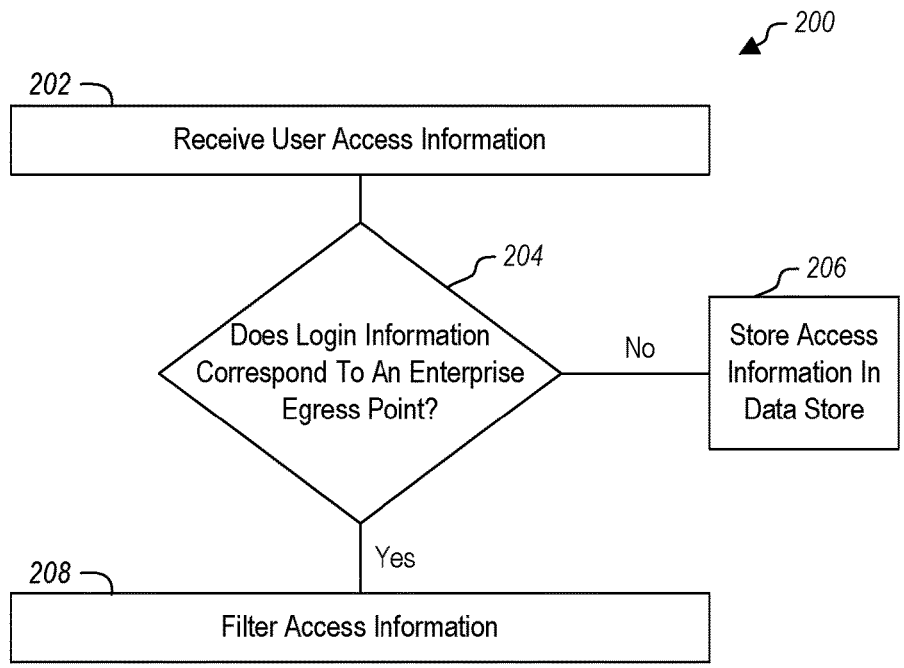
FIG. 2 illustrates a flow illustrating filtering location information related to an enterprise egress point.

Referring now to FIG. 2, an example process 200 is illustrated that can be used for filtering access information for a user for use in determining impossible travel scenarios. FIG. 2 illustrates that user access information is received at 202. For example, the user behavior analytics service 108 may receive information from the web portal 106 (which in some cases is provided to the web portal from the enterprise egress point 112) which includes the time when the user device 104 attempted access as well as location information, where such location information may identify the location of the user device 104 or a location associated with the enterprise in egress point 112.

FIG. 2 further illustrates at decision block 204 that a determination is made as to whether or not the access information corresponds to an enterprise egress point. As illustrated at 206, if the access information does not correspond to an enterprise egress point, such as in the example illustrated in FIG. 1 where the access corresponds to an access of the web portal 106 only, then the access information is stored in a data store, such as the data store 116 at the user behavior analytics service 108.

However, as illustrated at 208, if the access information corresponds to an enterprise egress point, such as the access of the user device 104 to the enterprise egress point 112, then the access information is filtered. As noted above, filtering may include discarding the access information such that it is not entered into the location server data store 116. Alternatively or additionally, the information may be entered into the data store 116 but marked with an indicator indicating that the information should not be used for impossible travel detection. Alternatively or additionally, filtering may include attempting to identify information that may indicate an actual location of the enterprise egress point 112 when that actual location corresponds, within some predetermined criteria, with the user device 104. Alternatively or additionally, the location of the user device 104 may be discovered in the internal network and the entry in the data store 116 for the access to the egress point is replaced, irrespective of the egress point location. For example, an egress point accessed may be in the UK, but the user may be accessing that egress point from Israel and this can be determined from enterprise network internal logs. Thus, the entry in the data store 116 for this particular access may note an access from Israel.

Additional details are now illustrated with reference to FIG. 3 for embodiments where filtering as illustrated at 208 in FIG. 2 may include acts for attempting to determine the location of the enterprise egress point 112 and storing that location in the data store 112 such that that information can be used in an impossible travel detection scenario. In particular, this may occur when the user 102 is using the user device in an enterprise location where the enterprise egress point 112 is a gateway at the enterprise location. Thus, in this example the user 102, and presumably their user device 104, are physically located in close proximity to the enterprise egress point 112 at a location within an enterprise such that the location of the enterprise egress point 112 can be used as a close approximation of the location of the user 102, or alternatively, the actual location of the user, exclusive of the location of the egress point 112, can be determined.

Figure 3:
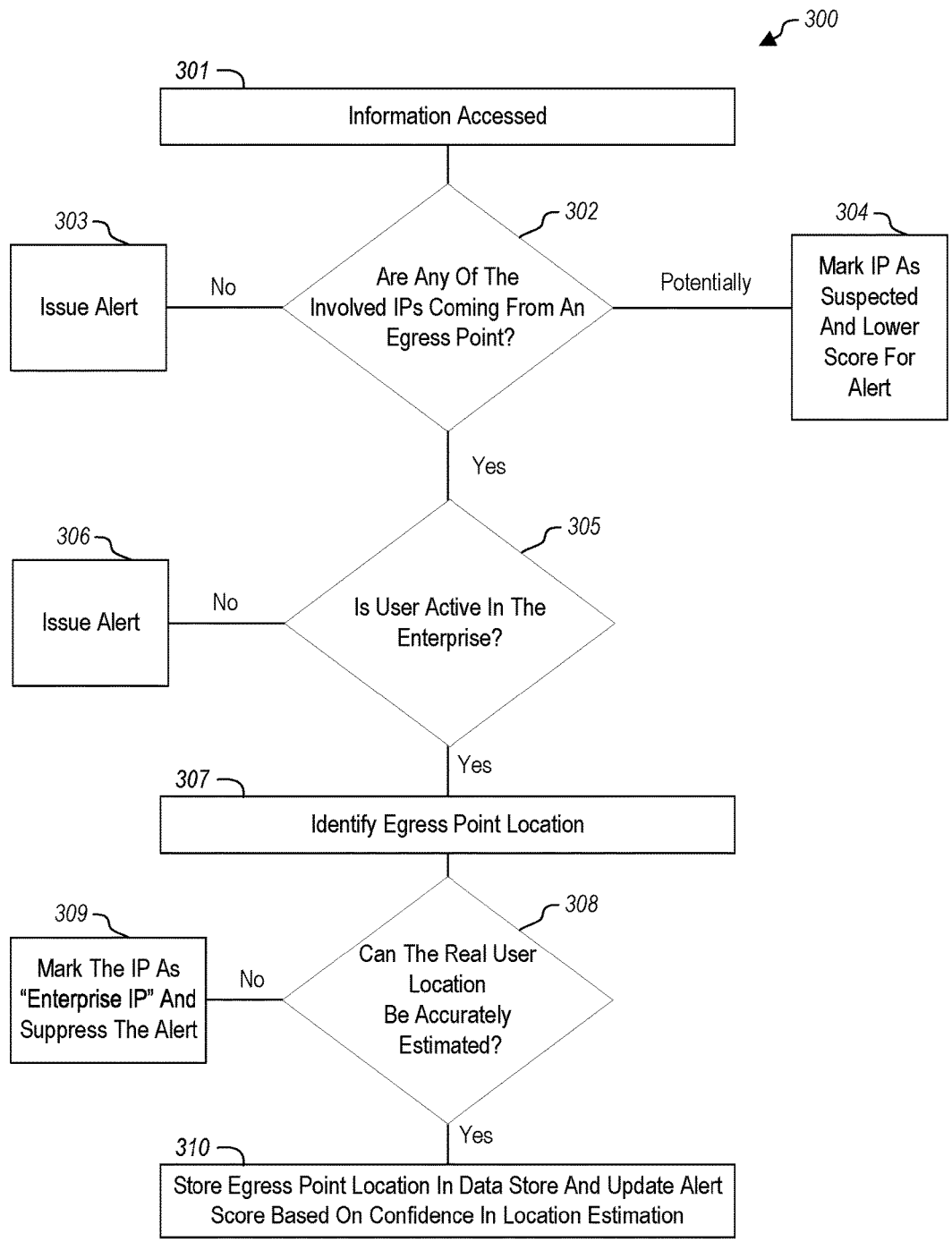
FIG. 3 illustrates a flow illustrating actions to take based on a user's activity in an enterprise.

FIG. 3 illustrates at 301 that access information that an enterprise access has occurred. For example, the user behavior analytics service 108 may be able to access such access information. It is known that the access information corresponds with user access in an enterprise. The access is associated with a first location. As illustrated at 302, embodiments attempt to determine if the first location corresponds to an enterprise egress point. If a determination is made that the access information does not correspond to an egress point, then as illustrated at 303, an alert may be issued indicating a network breach. For example, in some embodiments a determination may be made that the enterprise does not see a sufficient number of connections from an associated IP such that it is likely not associated, or represented in an enterprise data store 116. Thus, a lower threshold of number of connections may be used to indicate that an access is not at an enterprise egress point.

In some embodiments, there may be a probability that an IP address associated with the access is associated with an enterprise egress point, but the probability does not reach some predetermined threshold either indicating that the access is to an IP address associated with an enterprise egress point or that the access is to an IP address that is not associated with an enterprise egress point. For example, if the system is able to determine that the IP is being used by multiple users, embodiments can assign a probability that the IP is associated with an enterprise egress point. As illustrated at 304, the IP can be marked in the data store 116 it as a 'suspected IP' and a score can be lowered for the session. The lowered score could be used in an alert determination and would reduce the likelihood that an alert would be issued. If it can be determined above some predetermined threshold that an IP address in the data store 116 belongs to an enterprise egress point, then as illustrated at 305, embodiments attempt to identify if the user is active in the enterprise.

This can be accomplished in a number of different ways as will be described in more detail below but described in an abbreviated fashion here. In particular, various access logs can be accessed to determine if the user is performing various functions within the enterprise. If the actions are not being performed by the user 102 within the enterprise, then it is likely that unauthorized access is occurring and therefore, as illustrated at 306 an alert can be issued to a system administrator such that the system administrator can attempt to remedy the unauthorized access attempts, such as by blocking access for the user 102 or other performing other remediation activities. Note that in some embodiments, a determination if the user is active can be based on one or more of logs gathered from an authentication service, VPN logs, NAC system logs, domain controller logs or logs from a user PC that can be checked to determine at what times the user was active in the enterprise network.

Alternatively, if it can be determined that the user is active in the enterprise, then optionally, as illustrated at 307, activities can be performed to identify the enterprise egress point's 112 physical real-world location. Additional details will be illustrated below that illustrate how the real-world location of the enterprise egress point 112 can be determined.

As illustrated at 308, embodiments determine if the real world user location of the user can be accurately estimated. If the real world user location of the user cannot be accurately estimated, then, as illustrated at 309, embodiments mark the IP address in the data store 116 as an enterprise company IP address and disregard it for impossible travel computations.

If embodiments can estimate the real world user location of the user, embodiments change the user IP address location stored in the data store 116 with the estimated IP location for the user and change the session score based on an estimated confidence, as illustrated at 310.

Estimating a user location can be performed as follows. If the user is active via VPN, embodiments can leverage the VPN logs to determine the real user location with high confidence. If the user is active internally on an enterprise network, embodiments can try to estimate the location of the internal IP as explained below.

As illustrated at 310, the identified location for the enterprise egress point 112 can be stored in the data store 116 for the user behavior analytics service 108. The location of the user can be used by the user behavior analytics service 108 along with other login information for the user 102 to attempt to determine if user login is indicative of impossible travel scenarios.

The following illustrates details of how embodiments may be able to estimate the location of on-premises sites and their corresponding gateways which are acting as enterprise egress points, such as the enterprise egress point 112. This can be done in a number of different ways, as will be illustrated in more detail below.

Some embodiments of the invention are able attempt to estimate the location of an on-premises network and to detect that a user is connected to the on-premises network though an enterprise egress point.

Some embodiments may be configured to densify the location signal for entities (e.g., end-users, servers, network hardware, etc.) with a large quantity of high quality data. This can be used to estimate the location of an on-premises network, and its corresponding enterprise egress point 112, to evaluate user travel to and from the on-premises network.

A "real world location" might be one that is identifiable by GPS coordinates, cell tower triangulation, Wi-Fi based location technologies, and the like. In contrast, an "on-premises site" is an organization site where real world location is often obfuscated by virtue of the on-premises site being part of a larger organization network not having just a single particular geographic location associated with it and potentially having multiple geographical locations associated with the larger organization.

Embodiments can identify the locations of on-premises sites by processing one or more external real world geographical signals that contain for each entry a timestamp, a user, and some real world location indicator. Each entry may be stored in a data store. For example, the real world location indicator may include an IP address that can be translated to a location using 3rd party geolocation services. Alternatively or additionally, in some embodiments, the external signals are signals related to, or caused by virtual private network (VPN) connections made by users in the organization.

Figure 4:
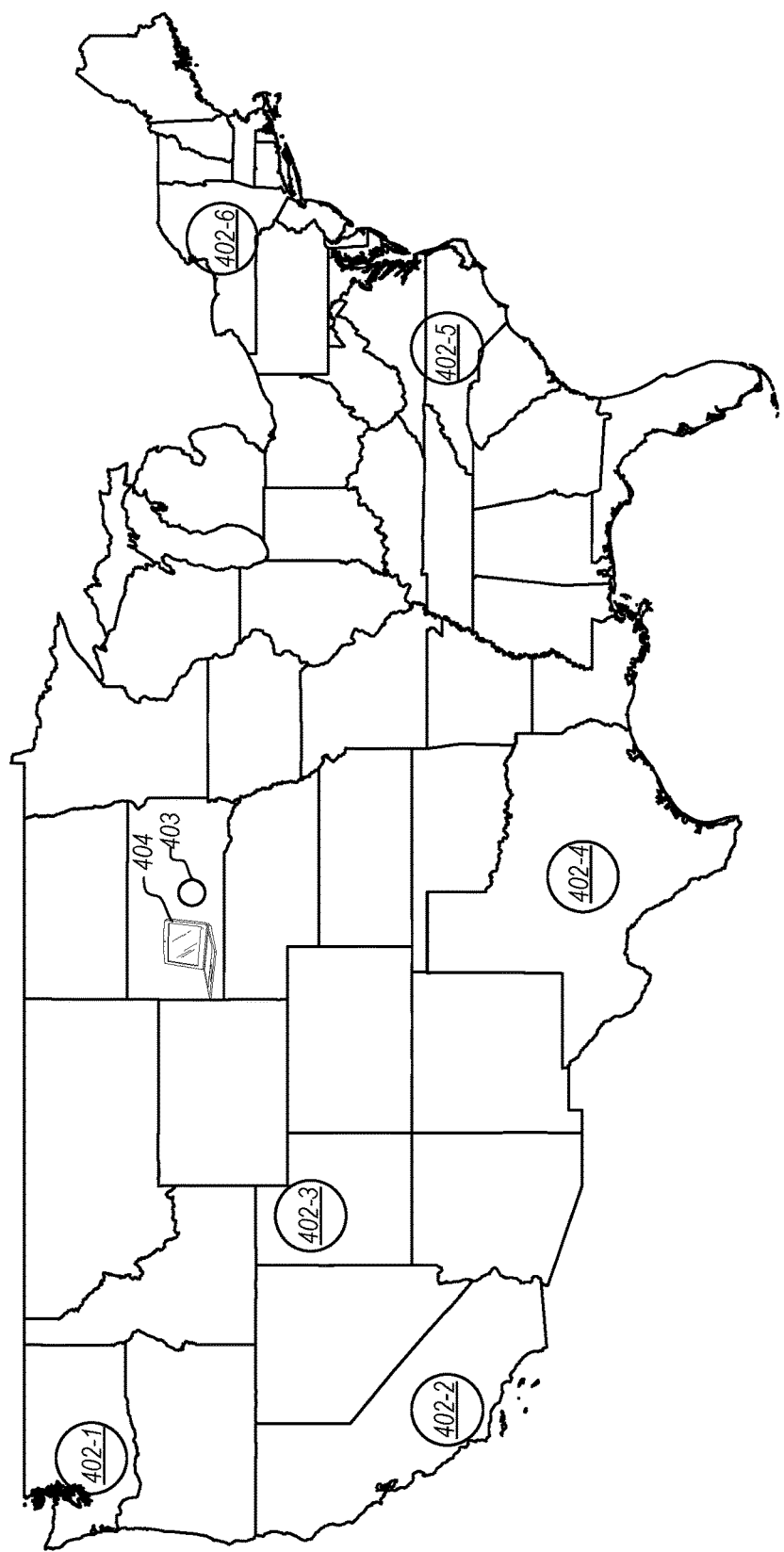
FIG. 4 illustrates a distributed enterprise system.

Referring now to FIG. 4, an example, is illustrated. FIG. 4 illustrates a geographically distributed organization network 400 (see FIG. 5), with different on-premises sites 402-1 through 402-6 distributed in different physical geographic locations. Note that while six sites are illustrated in the network 400 here, it should be appreciated that virtually any number of different sites could be implemented.

The network 400 is in communication with a geolocation service 414 to provide locational data for the remote devices, such as device 404-2 (an example of a user device 104). Again, although six sites 402, one remote device 404-2, and one local device 404-1 (an example of a user device 104) are illustrated, the number of sites 402, remote devices, such as device 404-2, and local devices, such as device 404-1, may be greater than or less than what is illustrated in the example network 400.

Figure 5:
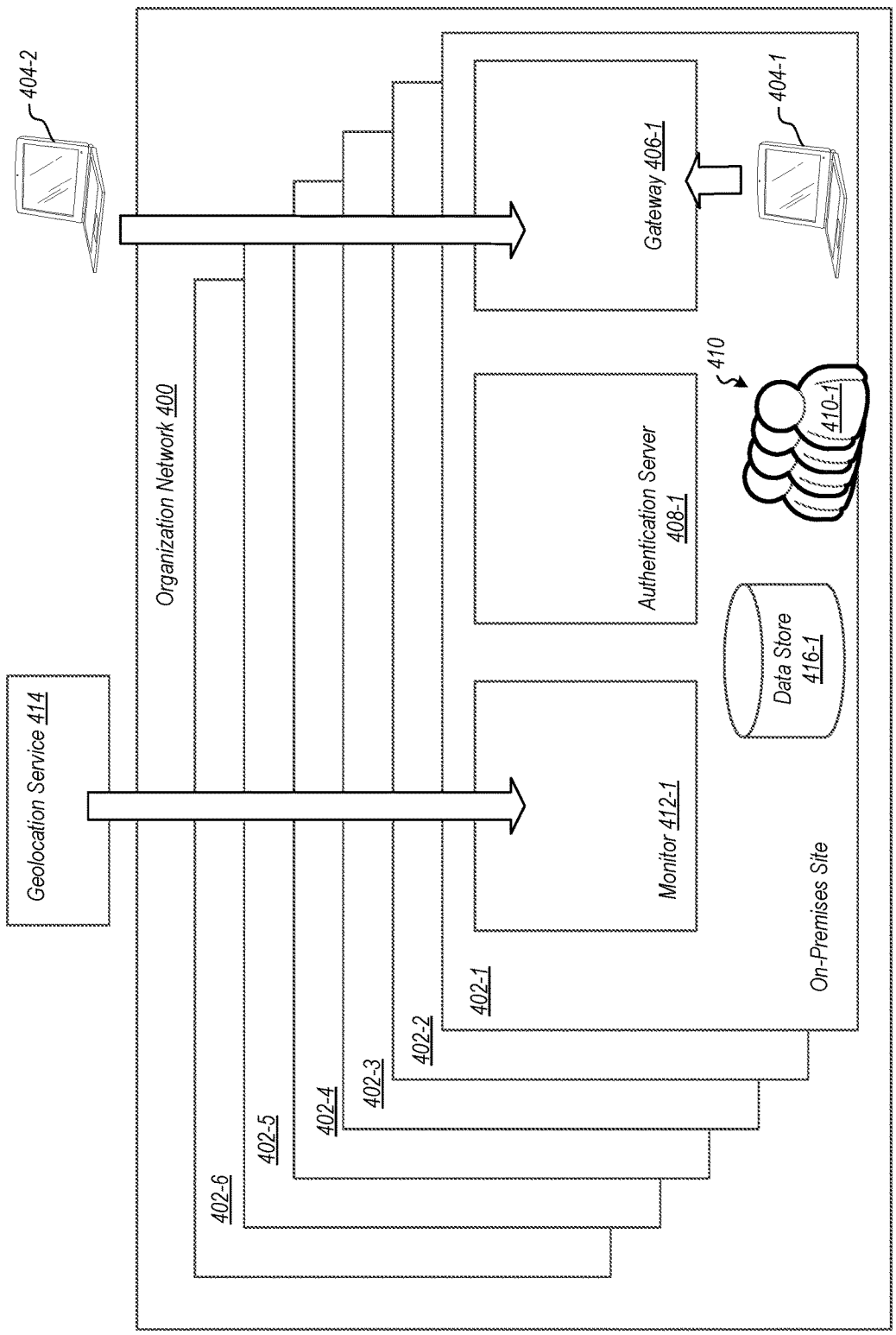
FIG. 5 illustrates another representation of a distributed enterprise system.

As illustrated in FIG. 5, a site 402-1 of the network 400 includes: a gateway 406-1, which may be an example of an enterprise egress point 112, operable to accept communications from devices connecting to the site 402-1; an authentication server 408-1, which is in communication with the gateway 406-1 and operable to authenticate entities seeking to access the network 400; and a monitor 412-1, in communication with the authentication server 408, and operable to aggregate connection information from the remote devices, such as device 404-2, to manage entity location data. Monitor 412 may incorporate functionality to act as the user behavior analytics service 108, including the filter 114, illustrated in FIG. 1. While site 402-1 is shown as having each of these components, other sites in the sites 402 may have a different set of components as some of the components can be shared between sites.

Gateways 406 and authentication servers 408 will be understood by one of skill in the art to include hardware devices and software running on those devices to provide the functionalities thereof. In various embodiments, the monitor 412-1 may be run on dedicated hardware or may be provided via software on a computing device used for several purposes, such as, for example, on the same hardware as the authentication server 408-1. In other embodiments, the network 400 may make use of fewer monitors 412 than sites 402; some or all of the sites 402 may share a monitor 412.

Remote devices, such as device 404-2, and local device 404-1 are operated by users, who may be humans or automated systems (e.g., "bots") that request connections to one or more sites 402 of the enterprise network The different sites (referred to herein generally as 402) can be utilized in a number of different ways and may be distributed geographically in a number of different ways. For example, each of the different sites 402 may represent a different branch office for the organization. In particular, a site 402 may be implemented in a location where employees or other users in the organization can physically go and work. In particular, a site 402 may include network hardware that allows users to go to the location of the site 402 and connect a user device, such as the user device 404-1 illustrated in FIG. 5, directly to the network hardware, such as in scenarios where the users connect to a local area network (LAN) to allow the users to access organization resources and connect with other users at the organization. In this example, the user device 404-1 is physically located in the same physical geographic location as the site 402-1.

The user device 404-1 may be any one of a number of different devices including devices such as laptop computers, desktop computers, cellular telephones, personal digital assistants, or other user devices.

Notably, the various sites 402 may be interconnected. This may be accomplished in a number of different fashions. For example, in some embodiments, a central system, which may or may not be located at one of the sites 402, may act as a coordinator between the various sites 402. Alternatively or additionally, one of the sites 402 may act as a coordinator site for the other sites in the network 400. In yet another alternative or additional embodiment, the various sites 402 may interconnect with each other in a peer to peer fashion. Interconnection of the various sites 402 allows the various individual users belonging to the organization to be able to access organization resources and communicate with each other through various network connections such that a user at any one of the sites 402 can communicate with the user at any of the sites 402 including the same site or other sites.

Additionally or alternatively, the sites may include provisions for allowing users to connect to the site from a user device 404 that is physically external to a given site 402. For example, as illustrated in FIG. 5, the user device 404-2 may physically exist outside of the network 400. In this example, the user device 404-2 can connect to a gateway (illustrated generally as 406, but shown in a specific example has gateway 406-1). Note, a user device that is outside of the network 400 will often try to connect to a site 402 that is the most proximate geographically to the user device 404. However, it should be appreciated, the user device 404 may connect to a different on-premises site when the user device 404 is outside of the network 400 for purposes of load balancing, or for other reasons.

The network 400 is able to learn the location of remote devices connected to the network by monitoring and logging the VPN (or other network tunnel) traffic used to connect the devices to the network 400. Note, as will be illustrated in more detail below, VPN log information may be used in some embodiments to add user location information to the data store 116 illustrated in FIG. 1 for use in detecting impossible travel scenarios. As users connect to a given site 402 in the network 400, the site will use the Internet Protocol (IP) or other addresses or information such as GPS signals, Wi-Fi geolocation information, or other information associated with the devices to perform geolocation for the connected devices. For each site the geolocation information for selected devices connected to that site 402 is aggregated over a period of time to estimate an estimated location for the site's physical geographical location. User accounts that access the site via local devices (e.g., the device 404-1 with respect to site 402-1) (e.g., not via a VPN or network tunnel) and use an internal IP address from the site 402 can be assigned a location equal to the site's location (estimated location or known physical location) and that location can be added to the data store 116 for use in determining impossible travel scenarios, but in some embodiments, may be excluded from the aggregation of geolocation information to estimate a sites location to avoid a self-confirmation bias. Thus, by using the network address information of devices (e.g., device 404-2 as shown in FIG. 5) that remotely log into the network 400 (e.g., Internet Protocol (IP) addresses), the physical locations of those devices may be determined through geolocation without requiring those devices to self-locate. The aggregated geolocations for the remote devices connecting to a site 402 (e.g., site 402-1) of the system are then used to infer a location of that site, which may then be assigned to devices (e.g., device 404-1) that are locally connected to that site 402, which may otherwise be un-locatable via geolocation.

Embodiments can implement a learning pipeline for locating virtual entities (such as an authentication server 408 (e.g., authentication server 408-1), such as a domain controller available from Microsoft Corporation, of Redmond, Wash.) in an internal network 400. The resulting mapping allows internal network actions and entities to be mapped into actual or approximate real world physical geographical locations. For example, embodiments may be able to locate an actual or approximate on-premises site location based on on-premises passive traffic monitoring. This enables the ability to approximate where users and their devices (e.g., device 404-1) are located in the world, even if they are currently only using resources of an internal network 400.

To estimate the location of an entity (such as an authentication server 408 or some other piece of network hardware), embodiments look for users that are affiliated to this entity. For example, a set of users may connect to a site 402 where the entity (e.g., the authentication server 408-1) resides as their home or primary site. That is, the users connect their devices (e.g., device 404-1) locally at the site (e.g., site 402-1) in some significantly affiliated way. For example, the users may authenticate at the site locally using LAN connections more often that they authenticate to other sites locally using LAN connections in the network 400. Alternatively or additionally, the users may be assigned the site 402-1 as their primary work locations. Embodiments then look for indicators of those affiliated users 410 using their devices in the real world. For example, in some embodiments, this can be done using information from a VPN feed to the network 400. Embodiments combine these indicators for these affiliated users 410, using statistical analysis, to derive the location of the entity (e.g., the location of the authentication server 408-1).

Illustrating now additional details, embodiments first define an entity, e.g., authentication server 408-1, in a local network, such as an on-premises site 402-1, to be located. This entity will have a strong location correlation with the users it serves. For example, embodiments may attempt to estimate the location of sites, and their authentication servers.

Embodiments can then define what is considered one or more affiliated users 410 for that entity and find those affiliated users 410. For instance, some embodiments can identify affiliated users 410 that appear at least X times in authentication requests in the subnets of the site 402-1. Alternatively or additionally, some embodiments can implement temporal queries such that any user that authenticates at the site 402-1 at least X times in the last Y timeframe is defined as an affiliated user.

Given the identification of affiliated users 410 from above, embodiments can look to identify their indicators in a data feed that contains some real-world location indicators. Users that have such indicators are considered the active users for the entity (e.g., authentication server 408-1). For example, embodiments may examine VPN connections made by users and translate the external IP addresses of devices for those users to geographical locations. Note that typically, when a device 404-2 connects to the network 400 through a VPN, the device will be associated with an external IP address provided by an internet service provider network external to the network 400 as well as being associated with an internal IP address associated with the network 400. The external IP address can be used in some embodiments, to estimate the location of the device 404-2. Alternatively or additionally, the device 404-2 may be associated with a Wi-Fi hotspot or router, with a known location. This information can be used to provide location information for the device 404-2. The indicators from the active affiliated users 410 for the entity are combined to a single prediction for the location of the site.

The devices, referred to generally as 404, access the network 400 by being authenticated by an authentication server, such as authentication server 408-1 of one of the sites, such as site 402-1. Remote devices, such as device 404-2, may connect to a given site, such as site 402-1, via a Virtual Private Network (VPN) connection or other tunnel to initiate a session, whereas local devices, such as device 404-1, connect to the site 402-1 at which they are located, such as through a LAN or other local connection. Whether a given device is a remote device or a local device depends on how it connects to the network 400, and a given device may be, at different times (or in some cases at the same time) a remote device and a local device. For example, a user may use a device as a local device while in an office location located at the site 402-1 to connect locally to the network 400 using a LAN. The user may use the same device at home or on travel and log into the network 400 via a VPN, making that device a remote device for the remote session.

For example, user 410-1, may specify a particular site, such as site 402-1, to log into, or the site 402-1 that is connected to may be automatically selected by a login agent running on the user's device based on, assignment of a site 402-1 to a user or user's device, a determination of the site 402-1 that is physically closest to the user, the site 402-1 that responds fastest to the user's communications (e.g., to avoid network congestion, to connect to a site 402-1 that has a better ping despite being located further away), to a site that is logically closer to a user (e.g., has less intervening network components between the user's device and the site 402-1), etc.

Entities (devices or user accounts) that are affiliated with a given site 402-1 may be noted and mapped by either the authentication server 408-1 or a monitor 412-1 (or other appropriate component) as using the given site 402-1 as their "home" site 402-1, whereas entities that are not affiliated (e.g., do not connect sufficiently often, are not assigned to the site, etc.) connect to the given site 402-1 may be noted as connecting to a "guest" site 402-1. In some embodiments, entities are mapped to the one site 402 on which they are most active (locally, remotely, or locally and remotely), while in other embodiments a given entity may have "home" status on more than one site 402 or on no sites 402 based on some factor, such as a minimum number of connections to a given site 402. For example, a user based out of Office A and whose account is associated with a first site 402-1 as a "home," may be transferred to Office B and begin using a second site 402-2 associated with Office B more frequently. The example user's account may be remapped to the second site 402-2 as a "home" over the course of several days/weeks/months as the user connects to Office B's site 402-2 more frequently than Office A's site 402-1. Contrarily, if the example user used (and left) a first device at Office A and the user were assigned a new device at Office B, the first device may remain associated with the first site 402-1 as its "home." In another example, a salesperson who frequently travels and logs on remotely to a first site 402-1 and a second site 402-2 may have each site 402-1 consider itself the "home" of the user's account due to the frequency at which the salesperson connects to each site 402 and the salesperson exceeding a minimum number of connections to each site 402 during a time period. When the monitor 412-1 determines the estimated location of the site 402-1, it may exclude the location information from "guest" entities, provide greater weight to the location information from "home" entities as compared to "guest" entities, or treat the location information equivalently, regardless of home/guest status. The monitor 412-1 may also periodically reevaluate whether a given entity has home or guest status on a given site 402-1.

The monitor 412-1 will observe the network address information from remote devices, such as device 404-2, connecting to the associated site 402-1 and will decide whether to store those addresses for use when inferring an estimated location of the site 402-1. Each time a user account successfully logs into the site 402-1 and establishes a session on the network 400, the monitor 412-1 may store the address information associated with the login request, or the monitor 412-1 may filter or restrict the number of logins from a given user account for a given time period for which to store the address information. For example, a user of a remote device 403 with an intermittent Wi-Fi signal may repeatedly gain and lose connection to the site 402-1, and may be forced to constantly re-authenticate with the authentication server 408-1, which the monitor 412-1 may choose to treat as multiple successful login attempts or as a single login attempt if the attempts fall within a predetermined time range of one another. Alternatively, the monitor 412-1 may collect all of the address information and later filter it when determining the estimated location of a given site 402-1.

Local devices, such as device 404-1, may also have their connection attempts to the authentication server 408-1 and activity session logged by the monitor 412-1 for security purposes. As will be appreciated, local devices, such as device 404-1, are associated with IP addresses internal to the network 400, which may be masked for use within the network 400, and therefore may produce spurious results if provided to the geolocation service 414. The monitor 412-1 will note the entities associated with the login and session (e.g., the user account and devices), and will assign the location (estimated or physical) of the site 402-1 to the entity at the time of login. For example, a user account for a user entity or Media Access Control (MAC) address, serial number, etc., for a device entity may be tracked to determine whether a second login using the same entity identifiers occurring at a second time violates one or more security rules for the user account.

In various embodiments, the monitor 412-1 may store and use, store and filter, or exclude from storage connection attempts that were rejected by the authentication server 408-1 (e.g., an incorrect username or password were provided). Similarly, the monitor 412-1 may store and filter (or block from storage) connection attempts received from a list of addresses that are associated with blocked parties, unreliable geolocation, or whose duration or number of connections meet an unreliability threshold (e.g., multiple short connections may indicate an unstable connection, and may be filtered out or ignored). For example, a user making use of a VPN connection from a smartphone may have a signal routed through a cell-provider's network to reach the site 402-1, and the address of the cell-provider's network is provided to the monitor 412-1 instead of the remote device's address internal to the cell-provider's network, making the address unreliable for geolocation, which may be flagged for the monitor 412-1 or noted over time by the monitor 412-1 as being unreliable based on the Internet Service Provider (ISP) frequently providing IP addresses unreliable for geolocation. Additionally or alternatively, the monitor 412-1 may filter out data from connection attempts that are beyond a preset distance from a site 402-1 or that specify a specific site 402-1, as their inclusion may affect the calculation of the location of the site 402-1.

When the monitor 412-1 uses the external IP address to determine the estimated location of the site 402-1, the stored external IP addresses that are to be used are transmitted to the geolocation service 414, which returns a geographic location associated with the external IP address. Examples of geolocation services 414 include, but are not limited to MaxMind of Waltham, Mass. and NeuStar of Sterling, Va., which provide geographic coordinates correlated to IP (or MAC) addresses back to the monitor 412-1. The geographic coordinates may be provided in terms of latitude/longitude coordinates, cities, regions, and countries. Geographic coordinates may be requested in real-time (as entities connect) or held in batches for periodic (e.g., daily, weekly, monthly) or on-demand processing by the geolocation service 414.

Each located remote login is associated with the geolocation provided by the geolocation service 414 and the time at which it was made to the network 400. Using these data, the monitor 412-1 is operable to infer a centralized location to the remote connections to use as an estimated site location. As more located remote logins are used, the inference of the estimated site location can be made more accurately, and the monitor 412-1 may apply additional filtering to which geographic data and login data are used in the calculations.

As will be appreciated, various algorithms and methods may be used to determine the centralized location for use as the estimated site location. In some embodiments, arithmetic mean values are estimated for the latitude and longitude from the latitudes and longitudes of the geolocation values of the located remote logins. In other embodiments, when the geolocation values are not provided as latitude/longitude coordinates, but as the name of a city, region, or country, the monitor 412-1 may use the mode of the geolocation values from the located remote logins or may convert the non-coordinate geolocation values into a latitude/longitude pair of coordinate for a central location of the city, region, or country.

In some embodiments, different weights may be applied to the geolocation values based on the frequency of use of a given identifier, a physical or temporal proximity of one login attempt to another login attempt, a physical proximity to the centralized location (which may be estimated recursively), a given time range at which the located remote login was made (e.g., during business hours, on a weekday), and whether the identifiers are unique during the period being estimated. The monitor 412-1 may also account for geographic and geopolitical data when calculating the centralized location, such as, for example, to avoid placing the estimated centralized location in a body of water, across a national/provincial border, on a road, in a use-restricted space (e.g., a park, a facility known to be used by another entity, an area zoned for residential use when a commercially zoned area is required), an area with high crime/taxes/rents, etc., or to specifically place the centralized location in a given nation/province/city/neighborhood.

In embodiments where the coordinates of the physical geographical site location are known to the monitor 412-1, the monitor 412-1 may apply machine learning techniques to vary the weights or hyperparameters of the learning algorithm to match the estimated site location to the physical geographical site location and apply the adjusted weights and hyperparameters in subsequent calculations for sites 402 that do not have a known physical geographical site location.

User and device entities can be divided into subgroups to produce an estimated site location for each subgroup. Additionally, the subgroups may be created based off of an individual entity's use patterns to determine the point about which the entity's remote logins are centered. Subgroups may be set according to criteria specified by the network administrators (e.g., entities connecting at least X times per month, entities at least X km away from a given point, entities within X km of a given point, a specified entity or entities) or may be identified automatically by the monitor 412-1 according to a clustering or distribution algorithm (e.g., k-means, DBSCAN).

To determine impossible travel scenarios, embodiments may also establish user presence over time. For example, embodiments may generate or reference a specific user timeline that contains logins and logoffs to, and from machines the user uses. In some embodiments, those login and logoff events can be based on network traffic. Some embodiments may identify when the login is made from a remote connection, when the user is actually near the machine itself (rather than the authentication being part of some automatic process). For example, some embodiments may require biometric authentication processes that examine human features to effectively log in to a machine. Alternatively or additionally, embodiments may require the presence or use of a user token, such as a smart card or a near field communication (NFC) device typically possessed by users to effectively log in to a machine.

In the context of environments with directory services, such as Active Directory available from Microsoft Corporation, of Redmond, Wash., the location (site-wise) of each event is also matched. Note that if the user is using a tunneling service (such as but not exclusive to VPN and Direct Access) this will be used as a different special site. Embodiments may try to infer from the signals collected as described above, where the user was and for how long. Thus for example, for a given a user JhonD and sites: S1 and S2 embodiments may produce data store 416-1 (which may be an example of the data store 116) entries similar to the following:

JhonD was identified at S1 using machine JhonDLaptop from 1 Jan. 2015 8:00 AM until 1 Jan. 2015 1:00 PM.

JhonD was identified at S2 using machine JhonDLaptop from 3 Jan. 2015 9:00 PM until 4 Jan. 2015 1:00 AM.

JhonD was identified at S2 using machine JhonDLaptop from 13 Jan. 2015 7:00 AM until 13 Jan. 2015 7:00 PM.

Referring once again to FIG. 5, where the example of a network 400 is illustrated, the gateway 406-1 operates to accept communications from the devices 404 at a location 403 accessing the network 400. The authentication server 408-1 communicates with the gateway 406-1 to authenticate the devices 404 seeking to access the network 400. The monitor 412-1, communicating with the authentication server 408-1, operates to aggregate connection information from the devices 404 accessing the network 400. The monitor 412-1 passively collects traffic to the network 400 from the devices 404. For example, in one or more embodiments, all or part of the collected traffic may be tunneled traffic from remote device 404-2 connected via VPN or other tunnel where users are allowed access to network services. Software agents on the devices 404 are not required to collect traffic and ascertain the login and logoff information.

The monitor 412-1 is further operable to determine, over a period of time, the login and logoff information of a user of a device 404 from the collected network traffic. The period of time, for example, may be more than one session, over the course of a single day, or over multiple days. The monitor 412-1 also determines network sessions, which may occur over a single day or multiple days, from the login and logoff information of the user of a device 404 and generates a timeline or timetable specific to the user that contains the network session logins. The timetable is generated based on when the packets associated with the login and logoff information are received and analyzed rather than what the information is that the packets contain. By analyzing the traffic of network packets the user identity can be determined along with which host the user was logging into. Upon determining how long the user was active in that host, a session or event may be assigned from which that particular user's presence may be determined.

Thus, the timetable identifies sessions when the user was active and when the user was otherwise not active based on the login and logoff information. The monitor 412-1 utilizes the timetable to determine whether the user of the device 404 was present at a particular location at a particular time. The timetable may also be used to identify sessions when the user is present at other particular locations at other particular times based on login and logoff information. Also, the timetable may be used to identify when the user is not actively on the network 400.

Entities such as the remote device 430 and local devices, such as device 404-1, access the network 400 by being authenticated by the authentication server 408-1. Thus, the monitor 412-1 in communication with the authentication server 408-1 can identify when the user is actively on the network 400 upon authenticating each login pursuant to utilization of an authentication protocol. Thus, the monitor 412-1 can also identify when the user is not actively on the network 400 via the authentication process. Utilization of an authentication protocol can include protocols such as NT LAN Manager (NTLAM), Kerberos, Lightweight Directory Access Protocol (LDAP) and Network Time Protocol (NTP) or any other suitable authentication protocol. Thus, successful authentication of the logins generates and updates the timetable. Authentication packets via the authentication protocols can be correlated to determine whether the collected traffic came from a particular device.

The type of connection or the type of login is also useful in determine a user's presence and for generating the timetable. Identifying the types of logins within the login information can be used to determine whether the user is actively on the network. For example, an interactive login requires the user to enter credentials which evidences the user is actually logging into the device. On the other hand, logins other than interactive logins could lead to determining that the user is not actively on the network 400. For example, automatic or triggered logins or logins occurring as a result of a service should be distinguished in the timetable or not be included in the timetable. Determining if a login is a remote or local login can also be used to generate the timetable.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 6:
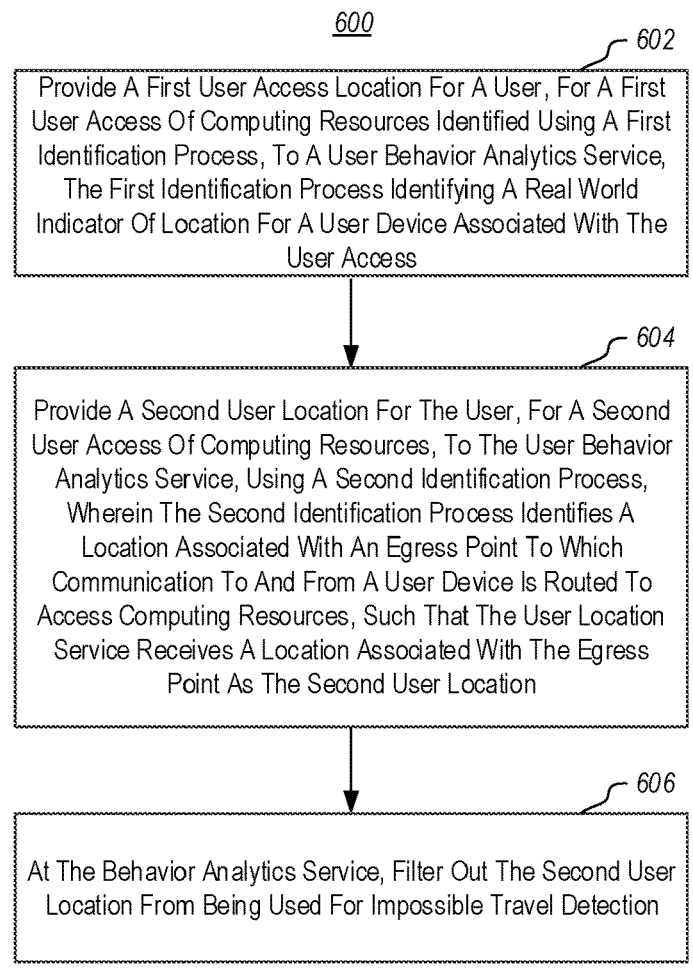
FIG. 6 illustrates a method of mitigating false positives for impossible travel alerts.

Referring now to FIG. 6, a method 600 is illustrated. The method 600 may be practiced, for example, in an impossible travel detection system. The method 600 includes acts for mitigating false positives for impossible travel alerts. The method 600 includes providing a first user access location for a user, for a first user access of computing resources identified using a first identification process, to a user behavior analytics service, the first identification process identifying a real world indicator of location for a user device associated with the first user access (act 602). For example, as illustrated in FIG. 1, the location of a user device 104 may be identified when a user device connects to a web portal 106. This may be accomplished by using one or more of an IP address, GPS coordinates, cellular triangulation, or the like. This location information may be provided to the user behavior analytics service 108 where it may be stored in a data store 116.

The method 600 further includes providing a second user location for a user, for a second user access of computing resources, to the user behavior analytics service, using a second identification process, wherein the second identification process identifies a location associated with an egress point to which communication to and from a user device is routed to access computing resources, such that the user behavior analytics service receives a location associated with the egress point as the second user location (act 604). An example of this is illustrated in FIG. 1 where a user device 104 connects to the enterprise egress point 112 to access computing resources. In this case, the user behavior analytics service 108 may receive location information through the web portal 106 about the enterprise egress point 112. Note that the location information received may not actually correspond to the real world location of the enterprise egress point 112. In particular, as noted above, the real world location may correspond to some enterprise location to which the enterprise egress point 112 belongs.

The method 600 further includes at the user behavior analytics service, filtering out the second user location from being used for impossible travel detection (act 606). In particular, embodiments can filter out any location information correlated to a resource access when the location information is associated with an enterprise egress point thus preventing that location information from being used when attempting to determine if impossible travel has been occurred. Thus, as illustrated in FIG. 1, the filter 114 can filter out locations associated with enterprise egress points.

The method 600 may be practiced where the egress point is an enterprise egress point for an enterprise.

In some such embodiments, the enterprise egress point may be a gateway. In these embodiments, the method may further include determining that the user is not active in the enterprise at a present time, and as a result triggering an access alert. In particular, a determination that attempts are being made to use an enterprise gateway by a user when the user is not active in the enterprise is typically an indication that attempts to access enterprise resources are being made by unauthorized users. This causes an alert to be triggered to notify system administrators of the attempted unauthorized use.

As demonstrated previously herein, the user can be identified as being active in the enterprise in a number of different ways. For example, various logs may be evaluated to identify user activities within the enterprise to attempt to identify valid actions within the enterprise. Alternatively or additionally, time clock check-ins and check-outs may be evaluated. Alternatively or additionally, users may possess physical tokens that are detectable to determine that a user is active in an enterprise.

In some embodiments, the method may further include determining that the user is active in the enterprise at a present time, and as a result identifying a real world location of the gateway and using the real world location of the gateway for impossible travel detection. For example, embodiments may identify the user is performing certain activities within the enterprise which would indicate that the user is indeed active within the enterprise. Various activities, as described above, can be performed to attempt to identify the location of a gateway to which the user is connected. If this location can be identified, then the location can be provided to the user behavior analytics service 108, and stored in the data store 116 for use in performing impossible travel detection.

In some embodiments, the method 600 may be practiced where the enterprise egress point is a VPN access point. In these embodiments, the method 600 can further include determining a user location using VPN login information and using the user location using VPN login information for impossible travel detection.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An impossible travel detection system configured to mitigate false positives for impossible travel alerts, the system comprising:
   a data store; and
   one or more hardware processors and computer readable memory configured to implement a user behavior analytics service coupled to the data store, wherein the user behavior analytics service is configured to:
   access a first user access location for a user, for a first user access of computing resources identified using a first identification process, to a user behavior analytics service, the first identification process identifying a real world indicator of location for a user device associated with the first user access;
   store the first user access location in the data store correlated to an access time for the first user access;
   access a second user access location for the user, for a second user access of computing resources, to the user behavior analytics service, using a second identification process, wherein the second identification process identifies a location associated with an egress point to which communication to and from a user device is routed to access computing resources, such that the user behavior analytics service receives a location associated with the egress point as the second user access location;
   identifying that the second user access location is associated with an egress point, but wherein the second user access location is not an actual location of the egress point;
   determining the actual location of the egress point;

determining if the actual location of the egress point is an accurate location for the user; and using the actual location of the egress point as the accurate location of the user for impossible travel detection when the egress point is the accurate location for the user and disregarding the actual location of the egress point for impossible travel detection when the egress point is not the accurate location for the user.

2. The system of claim 1, wherein the user behavior analytics service is configured to filter out the second user access location by preventing the second user access location from being stored in the data store.

3. The system of claim 1, wherein the user behavior analytics service is configured to filter out the second user location by:

substituting a different location for the second user location; and storing the different location in the data store correlated with a time for the second user access.

4. The system of claim 3 wherein the different location is a location of an enterprise gateway.

5. The system of claim 3 wherein the different location is determined from VPN login information.

6. The system of claim 1, wherein the user behavior analytics service is configured to determine that the user is not active in an enterprise at a present time, and as a result trigger an access alert.

7. A computer system comprising:
one or more hardware processors; and
one or more computer-readable media having stored thereon instructions that are executable by the one or more processors to configure the computer system to of mitigate false positives for impossible travel alerts, including instructions that are executable to configure the computer system to perform at least the following:
providing a first user access location for a user, for a first user access of computing resources identified using a first identification process, to a user behavior analytics service, the first identification process identifying a real world indicator of location for a user device associated with the first user access;
providing a second user access location for the user, for a second user access of computing resources, to the user behavior analytics service, using a second identification process, wherein the second identification process identifies a location associated with an egress point to which communication to and from a user device is routed to access computing resources, such that the user behavior analytics service receives a location associated with the egress point as the second user access location;
identifying that the second user access location is associated with an egress point, but wherein the second user access location is not an actual location of the egress point;
determining the actual location of the egress point;
determining if the actual location of the egress point is an accurate location for the user; and
using the actual location of the egress point as the accurate location of the user for impossible travel detection when the egress point is the accurate location for the user and disregarding the actual location of the egress point for impossible travel detection when the egress point is not the accurate location for the user.

8. The system of claim 7, wherein the egress point is an enterprise egress point for an enterprise.

9. The system of claim 8, wherein the enterprise egress point is a gateway.

10. The system of claim 9, wherein one or more computer-readable media further have stored thereon instructions that are executable by the one or more processors to configure the computer system to determine that the user is not active in the enterprise at a present time, and as a result trigger an access alert.

11. The system of claim 9, wherein one or more computer-readable media further have stored thereon instructions that are executable by the one or more processors to configure the computer system to determine that the user is active in the enterprise at a present time, which causes identifying the actual location of the gateway.

12. The system of claim 8, wherein the enterprise egress point is a VPN access point.

13. The system of claim 12, further comprising, determining a user location from VPN login information.

14. In an impossible travel detection system, a method of mitigating false positives for impossible travel alerts, the method comprising:
providing a first user access location for a user, for a first user access of computing resources identified using a first identification process, to a user behavior analytics service, the first identification process identifying a real world indicator of location for a user device associated with the first user access;
providing a second user access location for the user, for a second user access of computing resources, to the user behavior analytics service, using a second identification process, wherein the second identification process identifies a location associated with an egress point to which communication to and from a user device is routed to access computing resources, such that the user behavior analytics service receives a location associated with the egress point as the second user access location;
identifying that the second user access location is associated with an egress point but wherein the second user access location is not an actual location of the egress point; determining the actual location of the egress point;
determining if the actual location of the egress point is an accurate location for the user; and
using the actual location of the egress point as the accurate location of the user for impossible travel detection when the egress point is the accurate location for the user and disregarding the actual location of the egress point for impossible travel detection when the egress point is not the accurate location for the user.

15. The method of claim 14, wherein the egress point is an enterprise egress point for an enterprise.

16. The method of claim 15, wherein the enterprise egress point is a gateway.

17. The method 16, further comprising determining that the user is not active in the enterprise at a present time, and as a result triggering an access alert.

18. The method 16, further comprising determining that the user is active in the enterprise at a present time, which causes identifying the actual location of the gateway.

19. The method of claim 15, wherein the enterprise egress point is a VPN access point.

20. The method of claim 19, further comprising, determining a user location from VPN login information.

\* \* \* \* \*